United States Patent
Bini et al.

(10) Patent No.: US 10,058,813 B2
(45) Date of Patent: Aug. 28, 2018

(54) DEVICE FOR OIL SEPARATION AND REMOVAL FROM AN ORGANIC WORKING FLUID

(71) Applicant: TURBODEN SRL, Brescia (IT)

(72) Inventors: Roberto Bini, Brescia (IT); Roberto Bertanzi, Moniga del Garda (IT)

(73) Assignee: TURBODEN SRL, Brescia (IT)

( * ) Notice: Subject to any disclaimer, the term of this patent is extended or adjusted under 35 U.S.C. 154(b) by 396 days.

(21) Appl. No.: 15/028,485

(22) PCT Filed: Oct. 7, 2014

(86) PCT No.: PCT/IB2014/065120
§ 371 (c)(1),
(2) Date: Apr. 11, 2016

(87) PCT Pub. No.: WO2015/052652
PCT Pub. Date: Apr. 16, 2015

(65) Prior Publication Data
US 2016/0250579 A1   Sep. 1, 2016

(30) Foreign Application Priority Data
Oct. 11, 2013   (IT) .............................. BS2013A0143

(51) Int. Cl.
*B01D 45/00*   (2006.01)
*B01D 50/00*   (2006.01)
(Continued)

(52) U.S. Cl.
CPC ............ *B01D 50/002* (2013.01); *B01D 3/14* (2013.01); *B01D 45/08* (2013.01); *B01D 45/12* (2013.01);
(Continued)

(58) Field of Classification Search
CPC .. B01D 50/002; B01D 46/0031; B01D 45/16; B01D 3/14; B01D 45/12; B01D 46/2411;
(Continued)

(56) References Cited

U.S. PATENT DOCUMENTS 2,848,381 A * 8/1958 Nicholson ............... C10B 55/10
208/127
2,934,489 A * 4/1960 Canevari ................... B04C 5/22
208/127

(Continued)

FOREIGN PATENT DOCUMENTS

DE    10 2011 089929 A1   6/2013
EP       2 662 539 A1   11/2013
(Continued)

Primary Examiner — Dung H Bui
(74) Attorney, Agent, or Firm — R. RuschenaPatent Agent, LLC (57) ABSTRACT

Device for oil separation and removal from a working fluid of an organic Rankine cycle plant, said plant having at least a supply pump (6), at least a heat exchanger (1,16), an expansion turbine (5), a condenser (4), wherein the device is provided with a separator (2) and collection means (3), located between the evaporator (1) and the condenser (4) or between the evaporator (1) and a regenerator (16) of the organic Rankine cycle plant.

16 Claims, 6 Drawing Sheets

(51) Int. Cl.
*B01D 45/12* (2006.01)
*B01D 45/08* (2006.01)
*F01K 25/06* (2006.01)
*F01K 25/08* (2006.01)
*B01D 3/14* (2006.01)
*B01D 45/16* (2006.01)
*B01D 46/00* (2006.01)
*F01K 11/02* (2006.01)
*F01K 25/02* (2006.01)
*B01D 46/24* (2006.01)

(52) U.S. Cl.
CPC ......... *B01D 45/16* (2013.01); *B01D 46/0031* (2013.01); *F01K 11/02* (2013.01); *F01K 25/02* (2013.01); *F01K 25/06* (2013.01); *F01K 25/08* (2013.01); *B01D 46/2411* (2013.01)

(58) Field of Classification Search
CPC ......... B01D 45/08; F01K 11/02; F01K 25/02; F01K 25/08; F01K 25/06
See application file for complete search history.

(56) References Cited

U.S. PATENT DOCUMENTS

| | | | | |
|---|---|---|---|---|
| 4,337,068 A | * | 6/1982 | MacLean | B04C 5/28 209/712 |
| 4,572,726 A | * | 2/1986 | Van Abbema | B01D 50/004 406/109 |
| 4,713,096 A | * | 12/1987 | Kajihara | B04C 5/10 209/148 |
| 4,725,409 A | * | 2/1988 | Wolf | B01J 8/0055 422/145 |
| 4,904,281 A | * | 2/1990 | Raterman | B01D 45/12 208/161 |
| 5,123,939 A | * | 6/1992 | Morin | B01D 45/12 55/459.1 |
| 5,607,487 A | * | 3/1997 | Taylor | B01D 45/12 48/111 |
| 5,645,620 A | * | 7/1997 | Shenker | B01D 50/002 55/315.1 |
| 8,951,320 B2 | * | 2/2015 | Galdkov | B04C 5/185 55/282 |
| 2014/0202333 A1 | * | 7/2014 | Pomerleau | B04C 9/00 95/268 |
| 2017/0203253 A1 | * | 7/2017 | Zhu | B01D 53/60 |

FOREIGN PATENT DOCUMENTS

| | | |
|---|---|---|
| JP | S59 119003 A | 7/1984 |
| JP | H09 88503 A | 3/1997 |
| JP | 2006 283674 A | 10/2006 |
| JP | 2009 138684 | 6/2009 |

* cited by examiner

DEVICE FOR OIL SEPARATION AND REMOVAL FROM AN ORGANIC WORKING FLUID

TECHNICAL FIELD

The present invention is related to a device for oil separation and removal from a working fluid for a vapor plant and in particular for a plant working according to an organic Rankine cycle (hereafter, ORC cycle).

BACKGROUND ART

As known and summarizing, an ORC plant comprises at least a supply pump, at least a heat exchanger (usually, one or more evaporators but also one or more pre-heaters and one or more super-heaters), an expansion turbine, a condenser and eventually a regenerator. The performed thermodynamic cycle, organic Rankine cycle, is characterized in that the working fluid is an organic fluid. The cycle consists of two substantially adiabatic curves and two isobar curves with phase changes, to provide heat (evaporator) and subtract heat (condenser). The pump pressurizes the condensed liquid and feeds it to the evaporator, while the turbine transforms thermal energy into mechanical work. Therefore, aim of such a thermodynamic cycle is to transform, as much as possible, heat into mechanical work. The organic Rankine cycle is typically used in thermo-electric plants, to produce electrical energy.

In typical applications, rotational speeds and pressures usually require to adopt rotatable mechanical seals having an oil barrier to seal the working fluid from the external environment. The contact area between components, having a relative motion each other, requires a constant and pressurized lubrication, to ensure a perfect function and a long lifetime. In fact, such a lubrication reduces the wear, due to the direct contact between the two components. In such plants, an oil case is available for feeding all seals with pressurized oil. Said oil case must have a remarkable volume, typically 100-300 l for each megawatt of electric power, to provide lubrication for sealing and bearings of the turbines.

Typically, rotatable seals are susceptible to small oil losses. In some cases, also heavier losses can arise, due to a mechanical breakage of the sealing, as a consequence of technical inconveniences, for example thermal or mechanical overloads.

Typical small losses in an ORC plant are about 0.1÷0.5 l a day. Being at a greater pressure than the process operating pressure, the oil also flows inside the piping of the ORC plant and is mixed with the working fluid, thus changing physical and chemical characteristics of the working fluid. For example, due to such a mixing, the vapor tension of the organic fluid changes and, consequently, also its condensation pressure. Moreover, the chemical composition of the working fluid changes as well as the total flow-rate (which is the sum of working fluid and oil flow-rates). Such changes influence the thermal coefficient and the pressure of the performed cycle, worsening the global efficiency.

Therefore, a need exists for separating and removing the oil from the working fluid inside the plant, so as to grant a good efficiency along the lifetime.

At the time being, devices properly devoted for removing lubricating oil from sealing means as well as other high-boiling fluids (for example, thermal carrier fluids or component machining residual fluids) from the working fluid of an ORC plant are unknown.

INVENTION SUMMARY

Aim of the present invention is a new device for oil removal (due to losses from dynamic seals or other losses) from the working fluid, during the plant working time and according to an online procedure, i.e. without stopping the plant.

It is important to underline that the oil to be separated flows in the plant together with the working fluid: for this reason the oil can be found in each part of the plant and, as a consequence, with the ORC fluid both in a liquid phase and in a vapor phase, due to the dragging effect of the working fluid.

Therefore, the present invention relates to a device for oil separation and removal from the working fluid of an ORC plant, the working fluid being both in a liquid phase and in a vapor phase.

According to a first aspect, the invention is a device for oil separation and removal from the working fluid of an ORC plant, said plant comprising at least a supply pump, at least an evaporator, at least an expansion turbine and at least a condenser, wherein said device comprises a separator and collection means, located between the evaporator and the condenser (or the regenerator, if used) of the ORC plant.

An advantage of this aspect is that such device can be easily applied also to existing plants, without remarkable changes.

According to a preferred embodiment, the device also comprises a by-pass line between the portion of the evaporator in which is present the vapor phase of the organic fluid and the condenser (or regenerator) inlet, said separator and said collection means being located along the bypass line and wherein said separator is a cyclone.

An advantage of this embodiment is the possibility to separate and recover the oil from the working fluid, when the working fluid is in a vapor phase.

According to another embodiment, the by-pass line comprises a first valve downstream of the evaporator and a second valve upstream of the condenser for isolating the bypass line from the plant.

An advantage of this embodiment is that the by-pass can be isolated from the plant, so as to exclude it, if needed.

According to a further embodiment, the first valve, or a disc having a calibrated hole, downstream of the evaporator continuously adjusts the by-pass flow-rate in a range between $1/10000$ and $1/1000$ of the total plant flow-rate. The by-pass pressure is determined by the adjustment of the second valve, located upstream of the condenser.

According to the needs and the kind of plant, an advantage of this embodiment is the possibility to easily calibrate the by-pass flow-rate, by means of a simple valve or a disc having a calibrated hole. Said flow-rate must be adjusted, so as to have coherent speed values, with respect to pressure and temperature conditions, available in the separator and collection means.

According to a preferred embodiment a third valve is located upstream of collection means for allowing the injection of air or nitrogen under pressure, coming from a tank, when it is necessary to perform collection means discharge.

This embodiment allows to perform a fast discharge of oil collection means.

According to another preferred embodiment, a fourth valve is located between separator and collection means to isolate said collection means so that the separator continues working, while making the collection means discharge.

An advantage of this embodiment is the possibility to discharge collection means, without stopping the separator.

According to still another embodiment, said collection means are assembled as retrofitting on the head of the evaporator, by fastening means or by welding on the evaporator head, so as to allow an easy control of the collecting fluid temperature. Alternatively, said collection means are a separate device, autonomously heated and adjustable by means of a thermal carrier fluid or other heat source.

This embodiment allows to assemble this device on every ORC plants, without remarkably modify the plant.

According to a still further embodiment, the separator is based on fractional distillation and receives the mixture from a portion of the evaporator in which is present the liquid phase of the contaminated organic fluid.

An advantage of this embodiment is the possibility to separate and recover the oil from the working fluid when the ORC fluid is in a liquid phase.

According to another aspect, a method for oil separation and removal from a working fluid of an organic Rankine cycle plant is described, the method operating by means of a device as above described and comprising the following steps:
oil and working fluid inlet in the separator;
oil separation from the working fluid in the separator,
oil conveying inside collection means;
collection means discharging.

Advantageously, if the working fluid is available in a vapor phase, the oil separation in the separator is performed by means of a centrifugal or inertial effect.

Moreover, at the end of the separation phase, the method can comprise a coalescence phase of the oil droplets by means of a coalescent filter at the separator outlet.

An advantage is that the method can be applied on whatever ORC plant to obtain oil separation and removal from a working fluid, being the working fluid in a vapor phase.

A further advantage is that the method allows not only the separation of the lubricating oil coming from mechanical seals, but also the separation of other high-boiling oils, should they enter into the working fluid cycle.

Advantageously, when the working fluid is in a liquid phase, the separation takes place in the separator by means of a fractional distillation.

An advantage of this method is that the method can be applied on whatever ORC plant to obtain oil separation and removal from a working fluid, being both the working fluid and the oil in a liquid phase.

According to a preferred embodiment, the discharge phase of collection means is performed, isolating the bypass line by closing the valves downstream of the evaporator and upstream of the condenser and opening the valve located on the drainage of collection means.

An advantage of this method is the possibility to isolate the plant, by using only three valves.

According to another embodiment, the discharge phase of collection means takes place by closing the fourth valve, that isolates the plant, so that the separator continues working, and opening the valve, placed on the drainage of the collection means.

An advantage of this embodiment is the possibility to isolate the separator from the discharge line, so that the discharge line can operate autonomously.

According to still another embodiment, the discharge phase of collection means takes place by opening the third valve for injecting air or nitrogen under pressure, which pushes the oil towards the drainage of the collection means.

An advantage of this embodiment is the possibility to discharge oil by collection means in a fast and effective way.

BRIEF DESCRIPTION OF THE DRAWING

The different embodiments of the invention will be now described, by means of non-limiting examples, with reference to the enclosed drawings, wherein.

DETAILED DESCRIPTION

Figure 1:
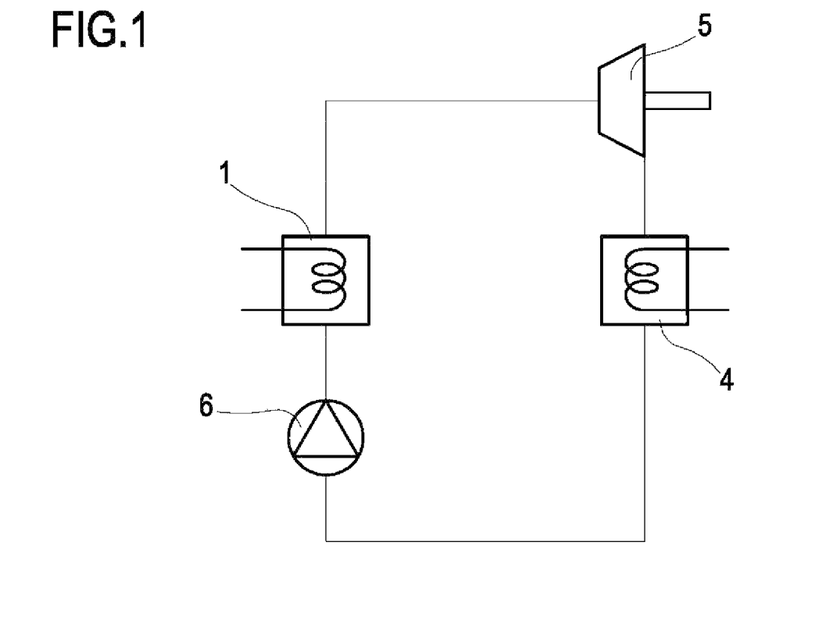
FIG. 1 shows the basic scheme of an ORC cycle.
Figure 2:
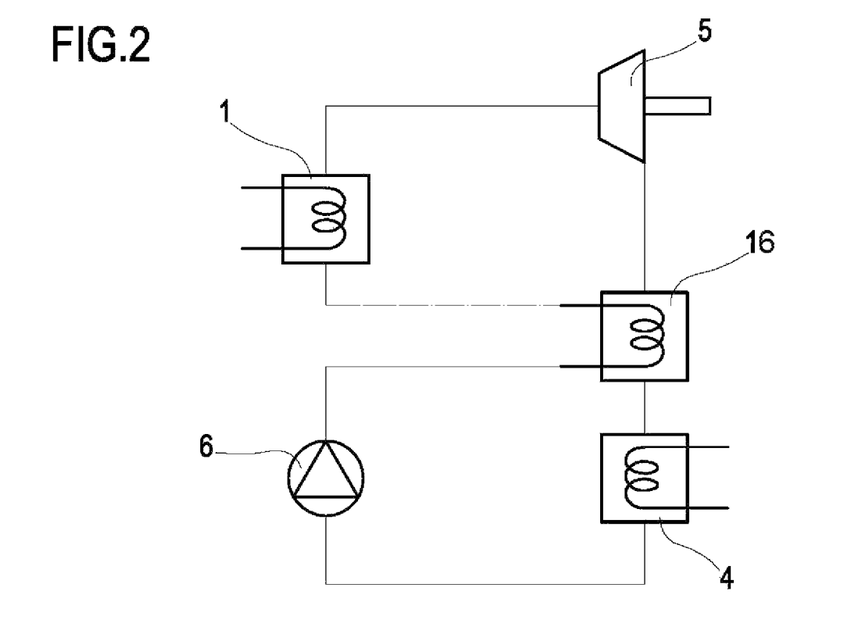
FIG. 2 is the scheme of FIG. 1 for a regenerative ORC cycle.

A first embodiment of the invention is a device for oil removal from the working fluid in a vapor phase of an ORC cycle (FIG. 1). As known, an ORC plant comprises at least a supply pump 6, at least a heat exchanger 1, typically an evaporator, an expansion turbine 5, a condenser 4 and, eventually, a regenerator 16 (FIG. 2). The related thermodynamic cycle, the organic Rankine cycle, comprises a feeding phase of an organic working fluid in a liquid phase, by means of the supply pump; then a heating and vaporization phase of said working fluid, then an expansion phase, an eventual regeneration phase and a condenser phase of the same working fluid follow.

Figure 3:
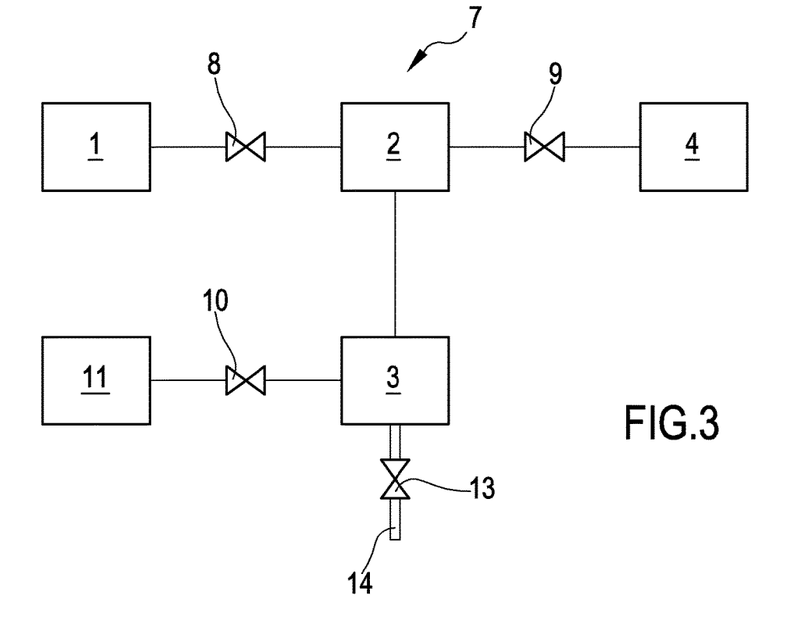
FIG. 3 shows a by-pass device, located between the evaporator and the condenser of an ORC cycle, according to a first embodiment of the invention.
Figure 4:
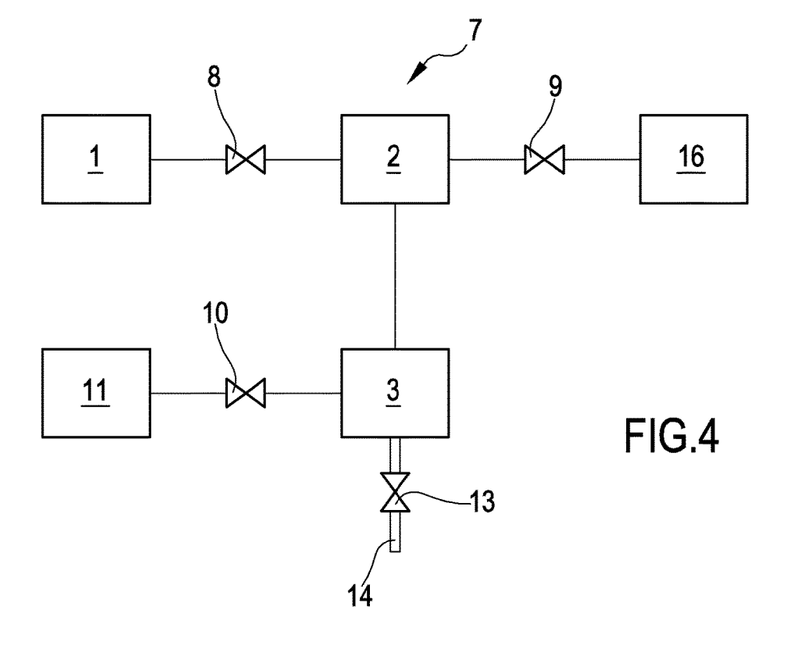
FIG. 4 shows the by-pass device of FIG. 3, located between the evaporator and the regenerator of an ORC cycle.
Figure 10:
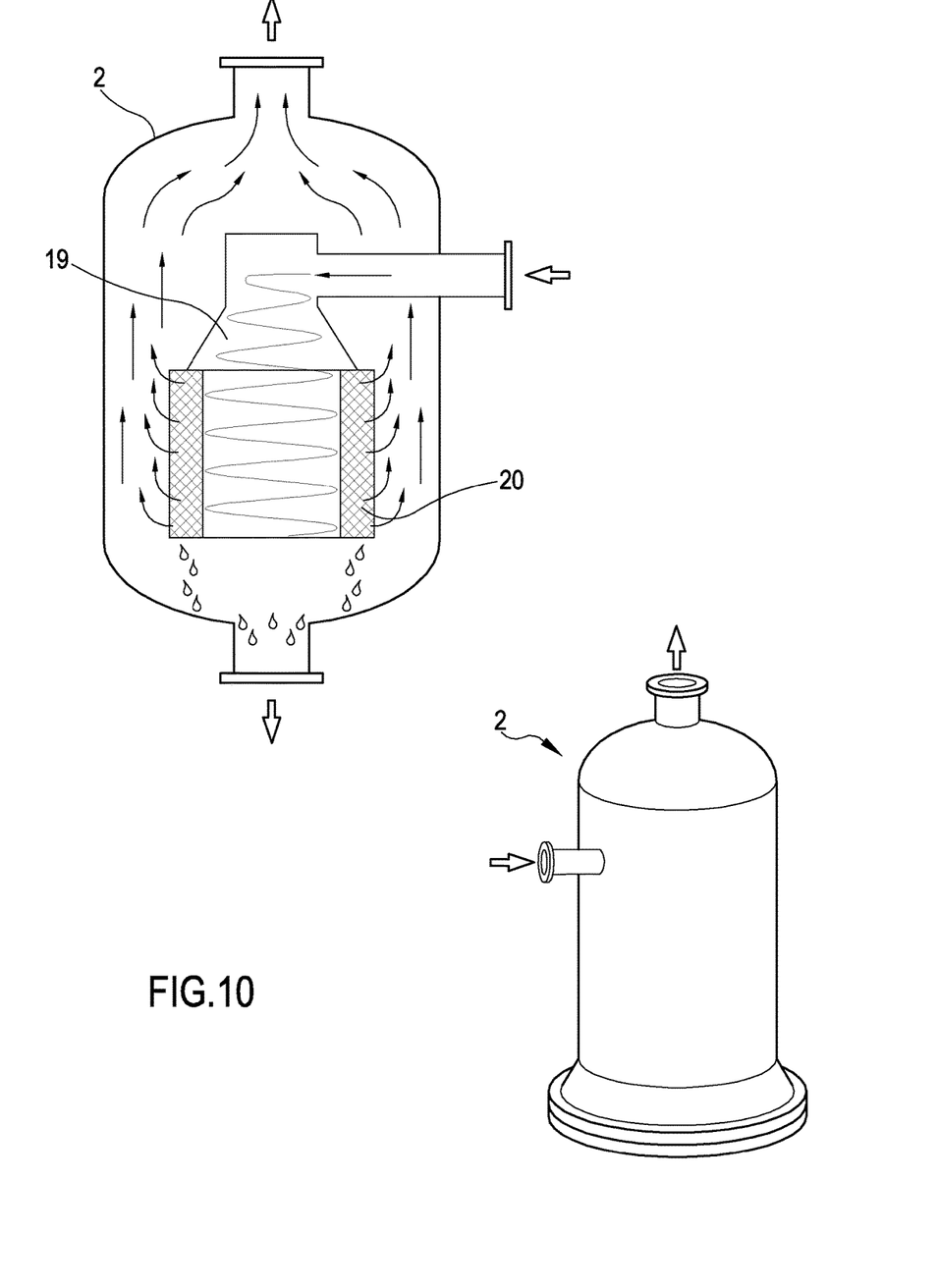
FIG. 10 schematically shows a centrifugal separator, having a coalescent filter.

Oil separation and removal from the working fluid in a vapor phase is realized by means of a device, which is located between the evaporator 1 and the condenser 4, or alternatively, between the evaporator 1 and the regenerator 16. Such a device (FIGS. 3, 4) comprises a separator 2, for example, a cyclone type or centrifugal type (FIG. 10), having at its end a coalescent filter 20, which must be kept heated, to avoid the condensation of the organic fluid in a vapor phase. Oil separation is a physical phenomenon, due to the different centrifugal forces acting on the ORC fluid in a vapor phase and on the oil in a liquid phase. After entering the separator 2, the bi-phase fluid is forced to a whirling path, during which oil droplets, subjected to a greater centrifugal force, are separated by the vapor flow of the ORC fluid and coalesce inside a suitable coalescent filter 20, until reaching dimensions able to provide a gravity fall in collection means 3. The flow path through the cyclone 19 will have change of directions, to facilitate (due to inertia too) the separation of the oil droplets from the vapor, which will go back into the working cycle.

Figure 7:
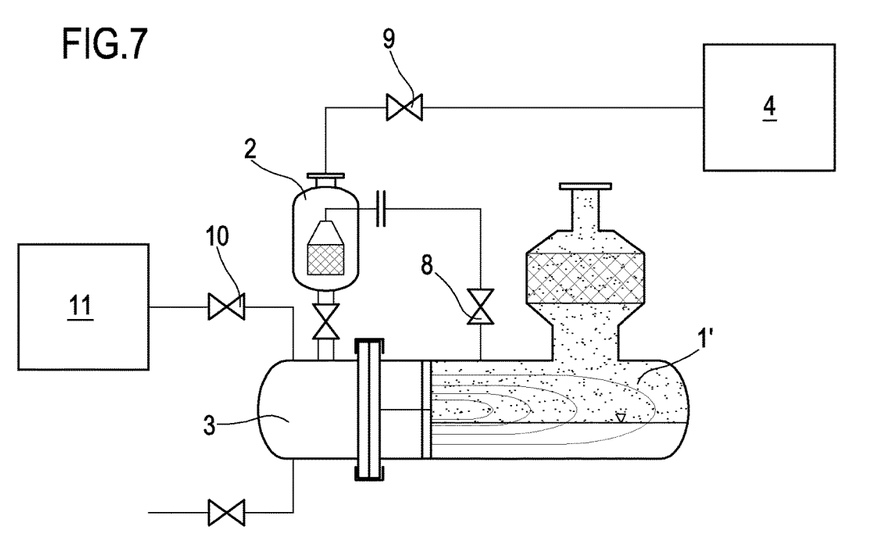
FIG. 7 shows a scheme, according to which the device is heated by the evaporator conduction.
Figure 8:
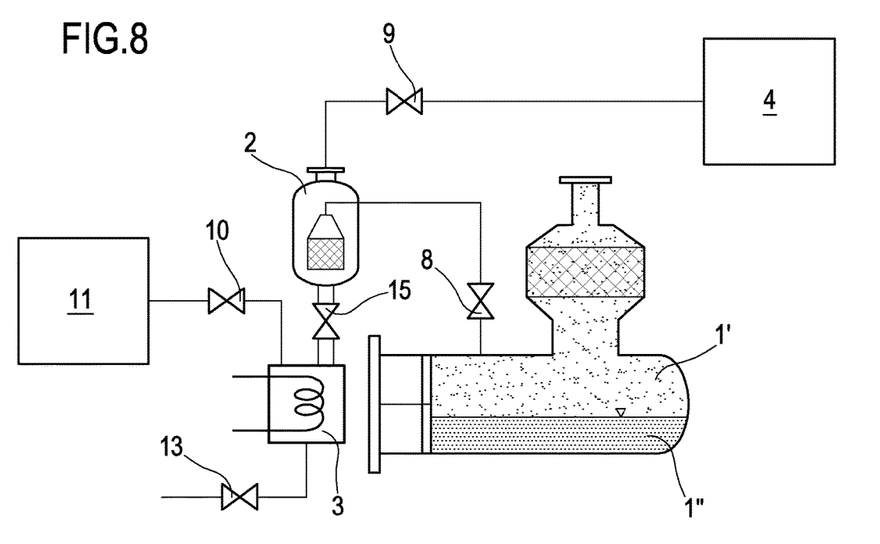
FIG. 8 shows a further device scheme, wherein the separator is autonomously heated.

Collection means 3 are a tank receiving oil particles, separated from the vapor flow, and can be located in contact with a high temperature evaporator portion, for example on the evaporator 1 head (FIG. 7), being the evaporator a shell and tube heat exchanger. In particular, the device can be assembled as retrofitting for existing plants, by means of fastening means, for example grasps. Moreover, the device can be directly welded on the evaporator head. Alternatively, the device can be a separate device, autonomously heated, for example electrically, being this solution suitable to easily control the temperature of the collected fluid. The device also comprises a by-pass line 7, fluid connecting the evaporator with the condenser. Inside said by-pass line the separator 2 and collection means 3 are installed. Typically, through the by-pass line flows about $\frac{1}{1000}$ of the total plant flow-rate. As said, the separated oil is collected into the tank 3 (collection means), from which, after a predetermined amount of time, the oil must be discharged. According to a preferred embodiment, the discharge of collection means 3 can be performed by isolating the plant by-pass, closing a first and a second valve 8 e 9 (respectively, downstream of the evaporator and upstream of the condenser) and opening a third valve 10. The latter valve 10 is located upstream of collection means 3 for allowing the injection of air or nitrogen under pressure, coming from a tank 11, said air or nitrogen pushing the liquid towards the drainage 14 of collection means.

According to an alternative embodiment, the discharge of collection means 3 can be performed by gravity, opening the valve 13, located on the drainage 14 of collection means 3. According to this embodiment the tank 11 for air or nitrogen and the related valve 10 are not anymore needed.

Figure 5:
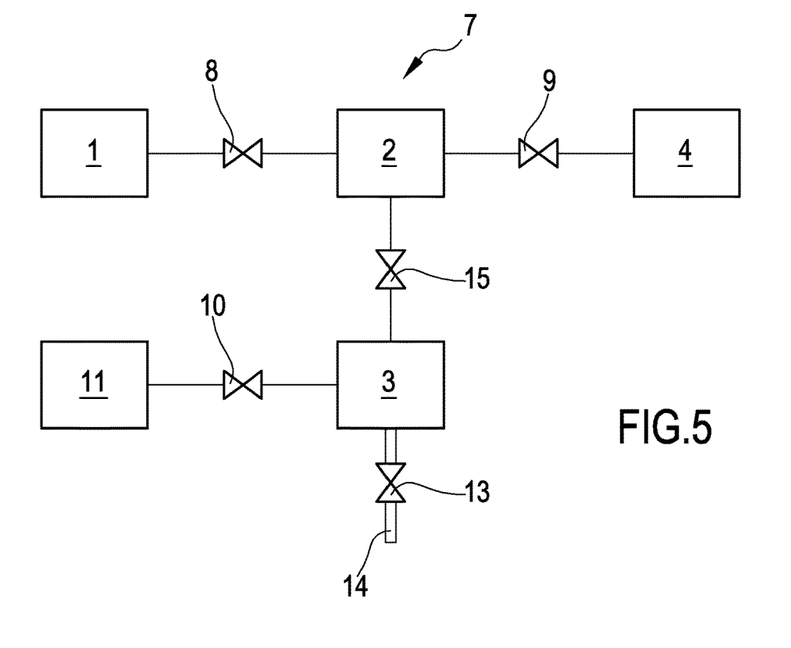
FIG. 5 shows the by-pass device located between the evaporator and the condenser of an ORC cycle, according to a further embodiment of the invention, with an intercepting valve of the separator.
Figure 6:
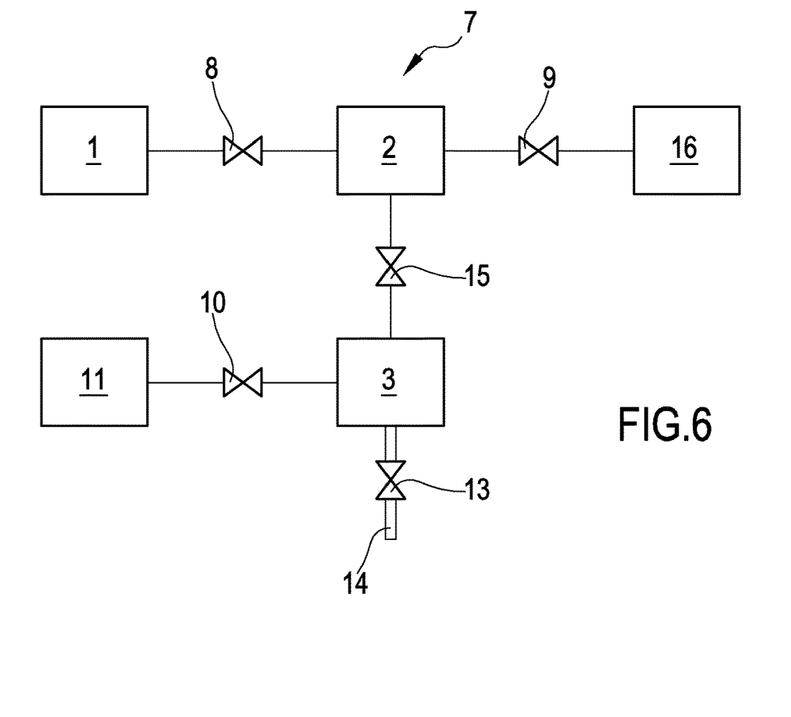
FIG. 6 shows the by-pass device of FIG. 5, located between the evaporator and the regenerator of an ORC cycle.

According to a different embodiment, a fourth valve 15 can be available between separator 2 and collection means 3 (FIGS. 5, 6), said valve isolating collection means from the plant, so that the separator continues working and in the meantime collection means can be discharged, according to pressure or gravity effect.

The by-pass flow-rate is determined by adjusting the first valve 8, downstream of the evaporator 1. Typically, the flow-rate can be continuously adjusted in a range between $\frac{1}{10000}$ e $\frac{1}{1000}$. To improve machining feasibility, the valve can be replaced by a disc, having one or more calibrated holes, or by a capillary tube or by other chocking means. All these means define a not adjustable by-pass flow-rate. The by-pass line pressure is determined by adjusting the second valve 9, located upstream of the condenser 4 or the regenerator 16.

Figure 9:
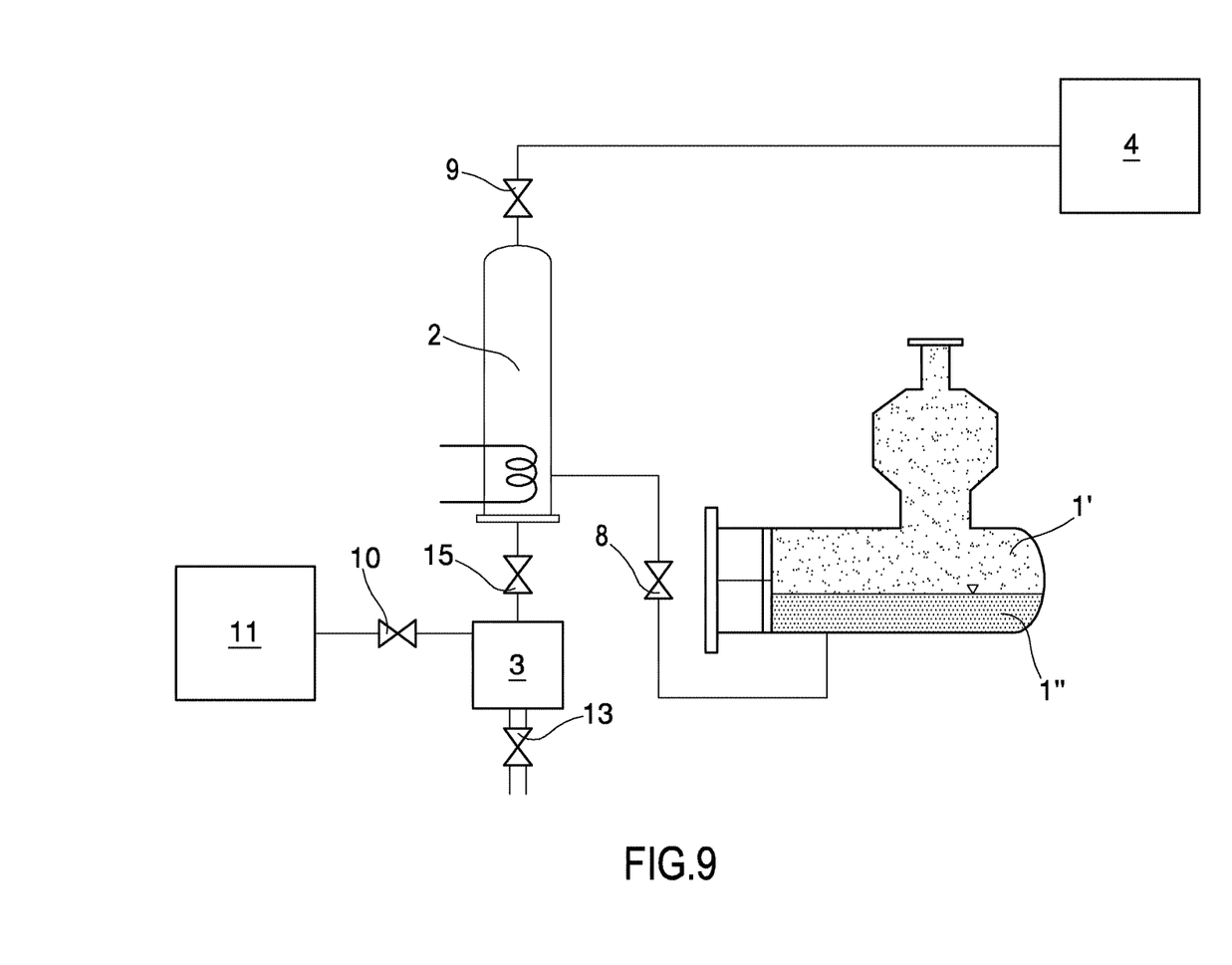
FIG. 9 schematically shows the assembly of the device, wherein the separator is based on fractional distillation.

As shown in FIG. 9, a further actuation of the invention is a device for oil removal from the working fluid in a liquid phase. Said embodiment differs from the previous one in the separator, which is now based on a fractional distillation. As known, fractional distillation can separate two or more substances. As for binary distillation, the mixture components are separated, based on their different volatility (or boiling temperature): in fact, in the highest portion of the distillation column (so called "head") there is a greater concentration of the most volatile substances, while in the lowest portion (so called "tail") there is a greater concentration of the less volatile substances. The distillation column is called fractioning column. The fractional distillation is based on a wide series of vaporizations-condensations, taking place in the device. The temperature profile in the column is characterized by higher temperature values close to boiler (where the mixture boils) and lower ones close to the condenser.

The oil separation, being the working fluid in a liquid phase can not be realized "on-line", requiring batch cycles in the limited volume of the separator 2, configured as a distillation column. Said volume is filled by liquid working fluid, by means of the valve 8, located through a pipe coming from the evaporator and containing liquid. The fluid, charged in the separator 2, is heated by means of heating elements (e.g. heat exchanger with thermal carrier fluid or electrical resistances). The high-boiling component (oil) is accumulated in the separator 2, which can be intercepted and discharged, after injecting air or nitrogen.

Other than the embodiments of the invention, as above disclosed, it is to be understood that a vast number of variations exist. It should also be appreciated that the exemplary embodiment or exemplary embodiments are only examples and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A system for oil separation and removal from a working fluid of an Organic Rankine Cycle plant, said system comprising an Organic Rankine Cycle plant and a device; wherein said plant comprising at least a supply pump (6), at least a heat exchanger (1,16), an expansion turbine (5), a condenser (4), and wherein said device comprises:
   a separator (2), and collection means (3), configured to be located between the evaporator (1) and a condenser (4) inlet or a regenerator (16) of the Organic Rankine Cycle plant,
   a bypass line (7) configured to fluid connect the evaporator (1) and the condenser (4) inlet,
   said separator (2) being located along the bypass line (7) that further includes a first valve (8) upstream of the separator (2) and a second valve (9) downstream of the separator (2) for isolating the bypass line (7) from the Organic Rankine Cycle plant, the device further comprises a third valve (10) which is located upstream of the collection means (3) for injecting air or nitrogen under pressure, coming from a tank (11), when it is necessary to perform the discharge of the collection means (3); and wherein said separator (2) comprises a cyclone (19) which, in turn, comprises a coalescent filter (20) located in a terminal part of said cyclone (19).

2. The system according to claim 1, wherein said bypass line (7) is configured so as to connect a portion (1') of the evaporator (1) in which is present the vapor phase of the working fluid and the condenser (4).

3. The system according to claim 1 wherein said first valve (8) is configured to continuously control a bypass flowrate in a range between $\frac{1}{10000}$ and $\frac{1}{1000}$ of the total plant flowrate.

4. The system according to claim 1 wherein said second valve (9) is configured to adjust the pressure on the bypass line.

5. The system according to claim 1 wherein a calibrated hole disc is configured to determine a bypass flowrate.

6. The system according to claim 1 wherein a capillary tube is configured to determine a bypass flowrate.

7. The system according to claim 1 further comprising a fourth valve (15) which is located between the separator (2) and the collection means (3), said fourth valve (15) being configured to isolate said collection means (3) so that the separator continues working while making the discharge of the collection means (3).

8. The system according to claim 1, wherein said device is assembled on a head of the evaporator (1) by fastening means.

9. The system according to claim 1 wherein said collection means (3) is configured to be welded on a evaporator (1) head, so as to allow an easy control of the collecting working fluid temperature.

10. The system according to claim 1 wherein said collection means (3) is a separate device that is autonomously heated.

11. The system according to claim 1, wherein said separator (2) is configured for fractional distillation and receive a mixture of oil and working fluid from a portion (1") of the evaporator in which is present a liquid phase of the working fluid.

12. A method for oil separation and removal from a working fluid of an Organic Rankine Cycle plant by means of the system according to claim 1, wherein said method is comprising the following steps:

oil and working fluid inlet in the separator (2);
oil separating from the working fluid in the separator (2),
oil conveying inside the collection means (3);
collection means (3) discharging,
wherein said discharge phase of the collection means (3) takes place by opening the valve (10) for injecting air or nitrogen under pressure, which pushes the oil towards the drainage (14) of the collection means (3).

13. The method according to claim 12 where said step of oil separating from the working fluid in a vapor phase in the separator (2) is performed by means of a centrifugal or inertial effect.

14. The method according to claim 12 further comprising, at the end of the separating phase, a coalescence phase of the oil droplets by means of a coalescing filter (20) at a separator (2) outlet.

15. The method according to claim 12 where said step of oil separating from the working fluid in a liquid phase in the separator (2), is performed by means of a fractional distillation.

16. The method according to claim 12, wherein said discharging phase of the collection means (3) is performed isolating the bypass line (7) by closing the first valve and the second valve (8,9) and opening a valve (13) located on the drainage (14) of the collection means (3).

* * * * *